Oct. 29, 1968     D. E. HASELWOOD     3,408,629
DATA HANDLING SYSTEM
Filed Jan. 10, 1966     4 Sheets-Sheet 1

Inventor
DONALD E. HASELWOOD
by
Mason, Kolehmainen,
Rathburn and Wyss
Attorneys

Oct. 29, 1968  D. E. HASELWOOD  3,408,629
DATA HANDLING SYSTEM
Filed Jan. 10, 1966  4 Sheets-Sheet 2

Oct. 29, 1968  D. E. HASELWOOD  3,408,629
DATA HANDLING SYSTEM
Filed Jan. 10, 1966  4 Sheets-Sheet 3

Oct. 29, 1968  D. E. HASELWOOD  3,408,629
DATA HANDLING SYSTEM
Filed Jan. 10, 1966  4 Sheets-Sheet 4

United States Patent Office 3,408,629
Patented Oct. 29, 1968

3,408,629
DATA HANDLING SYSTEM
Donald E. Haselwood, Deerfield, Ill., assignor to A. C. Nielsen Company, Chicago, Ill., a corporation of Delaware
Filed Jan. 10, 1966, Ser. No. 519,731
9 Claims. (Cl. 340—172.5)

ABSTRACT OF THE DISCLOSURE

A data handling system capable of carrying out programs, incident to completing one program, automatically stores a future time at which another program is to be initiated. A comparator compares the stored future time with actual or elapsed time and delivers a start signal to the system to start the designated program when the stored future time is reached.

---

This invention relates to a data handling system and, more particularly, to new and improved means for controlling the periods of operation of a data handling unit or system.

There are a number of applications in which it is desirable to be able to control the data handling or processing unit to effect the initiation of a program of operation a known time increment, either fixed or variable, following a prior program. As an example, if the rental charge for a data handling unit is based on the time that the unit is in use or on and if the operations to be performed on the unit occur at time intervals spaced at an interval greater than the period required for the unit to perform the necessary operation, the charges for the use of the unit are unduly high if the unit is held in the on condition between the actual periods of use. In other applications it is desirable to control data handling units to initiate one program a given time increment after the performance of a prior program and to control the time interval that elapses between the programs in dependence on the nature of the prior program.

Accordingly, one object of the present invention is to provide a new and improved system for controlling the periods of operation of a data handling or processing unit.

Another object is to provide a system for controlling the starting of a data handling unit at time spaced intervals.

A further object is to provide a system for controlling the starting of a data handling or processing unit in which a time entry is stored incident to the performance of one program and is compared with elapsed or real time supplied by a timing unit to control the initiation of a subsequent program when a predetermined relation is established between the time entry and elapsed time.

A further object is to provide a system for time controlling the initiation of the programs of a data handling unit which includes a means for storing a future time entry as one program is carried out and another means for comparing the stored time with elapsed or real time to effect the initiation of the next program when a predetermined relation occurs between the two times.

In accordance with these and many other objects, an embodiment of the invention is illustrated in conjunction with a system including a stored program data processing or handling unit which automatically requests and receives information concerning the tuning conditions and on-off status of wave signal receivers from a plurality of remote stations and automatically performs operations on the received information to establish, for instance, program preference indices or ratings. In general, this system operates by assigning addresses to the remote stations which are out of the range normally used for addressing storage facilities in the data handling unit and by interposing a line adapter between the data processing unit and the remote units for translating received addresses into signals for selecting the desired stations. In a representative system of this type, the actual transmission of the selecting signals from the computer or data handling unit to the line selecting unit and the transfer of the received signals to the data handling unit requires a very short period of time. The time required for the actual station selection and the transmission of the data from the selected station requires a relatively long interval of time.

In accordance with the present invention, the system includes a new and improved means for placing the data handling unit in an off or inoperative state in the intervals in which the presence of the data handling unit is not actually required and for automatically returning the data handling unit to an on or operative condition at spaced time intervals in accordance with the times at which the actual presence of the data handling unit is necessary. This is achieved by providing a continuously operative timing means operable to settings representing real time or time elapsed from an arbitrary reference point and by providing an addressable time entry storage means external to the central data handling unit which is accessed by addresses in a range different from those used to access storage facilities in the data handling unit. The stored program for the central data handling unit includes, incident to each program, an instruction transferring a future time to the time entry storage means and an operation code placing the computer in an inoperative or off state at the end of the desired program. The future time entry transferred to the time entry storage means is established by the computer program. One method of establishing this time entry is by adding a fixed time increment to a real time entry derived by addressing the timing circuit. Alternatively, the time increment to be added to the real time derived by addressing the timing unit can be determined by arithmetic operations in the computer and can be dependent on factors established during the existing or prior program.

The future time entry stored in the time entry storage means under the control of the data handling unit is continuously compared against the real time or elapsed time settings of the timing circuit until a predetermined relationship exists therebetween, such as equality. At this time, the comparing means actuates an on-off control for the central data handling unit to place the computer in operation to begin the performance of the next program which may be either identical to the prior program or a different program. In this manner, the preformance of each program by the computer acts to establish the time at which the next computer operation is to begin.

Many other objects and advantages of the present invention will become apparent from considering the following detailed description in conjunction with the drawings in which.

Figure 1:
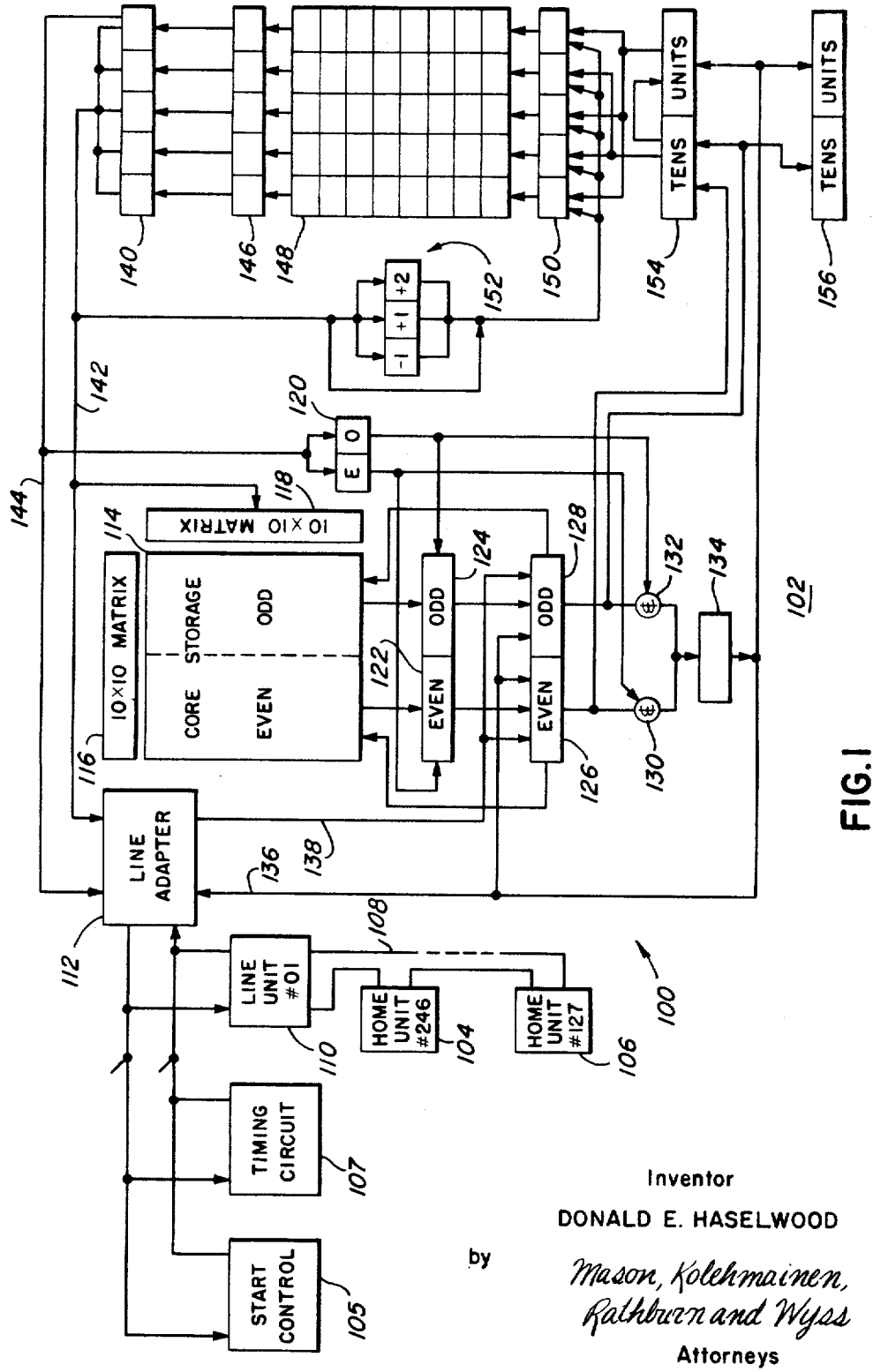
FIG. 1 is a block diagram of a data handling system embodying the present invention.

Referring now more specifically to FIG. 1 of the drawings, therein is illustrated a block diagram of a system 100 which embodies the present invention and which is identical in many respects to the system shown and described in detail in the copending application of Donald E. Haselwood, Ser. No. 496,361, filed Oct. 15, 1965. The system 100 includes a central data handling unit or computing means 102 which establishes ratings based on the viewing habits of a sample of collaborators located in areas geographically remote from the computer 102. The receivers at the homes of the collaborators are provided with a home unit, such as a home unit 104 or 106, and different groups of the home units are connected to different common signaling channels, such as a signaling channel 108, each of which is terminated in a line unit, such as a line unit 110 connected to the channel 108. The computer or central data handling means 102 automatically collects wave signal receiver use and tuning condition information from the plurality of home units, 104, 106 scattered over a large geographical area, such as the United States, and utilizes the collected information to establish ratings.

Each of the home units, such as the home units 104 and 106, is identified by an individual designation, such as the designation "246" for the home unit 104 or the designation "127" for the home unit 106, and is placed in operation by the receipt of its individual designation from the connected signaling channel, such as the signaling channel 108. In response to the receipt of its individual designation, the selected home unit 104, 106 transmits data over the connected signaling channel 108 to the terminating line unit 110 representing items of variable data derived from the home wave signal receiver or receivers to which the selected home unit is connected. These variable data items commonly include the tuning condition of the wave signal receiver and its on or off condition. The information transmitted over the signaling channel 108 from the selected home unit is stored in the connected line unit, such as the line unit 110, until demanded by the unit 102. Although the home units 104, 106 can be of any suitable construction, they preferably comprise units of the type shown and described in detail in the copending applications of Charles H. Currey et al. Ser. No. 232,684, filed Oct. 24, 1962, now Patent No. 3,289,170, and Donald E. Haselwood et al., Ser. No. 410,475, filed Nov. 12, 1964, now Patent No. 3,323,112, both of which copending applications are assigned to the same assignee as the present application.

Since the unit 102 can transmit and receive data in much less time than the home unit selection and data transmitting and receiving operations can be performed by the units 104, 106, and 108, it is desirable to place the unit 102 in an inoperative or off condition while the slower operations are being performed and to return this unit to an operative or on state when its higher data handling speeds can be fully utilized so as to reduce computer rental charges. Accordingly, the system 100 includes a start control unit 105 which can place the data handling unit 102 in operation at times determined by a future time entry stored in the control 105 by the unit 102 prior to the time at which the unit 102 is placed in an inoperative state. This future time entry is compared with a real time or elapsed time indication provided by a timing circuit 107 which can also provide real time on demand to the unit 102. The line unit 110, the start control 105, and the timing circuit 107 are accessed by individual addresses through a line adapter 112 which provides an interface between these components and the central data handling unit 102.

The central data handling unit 102 can comprise any suitable data handling or processing unit of the many types well known in the art. To illustrate the operation and construction of the system 100, this system is illustrated in conjunction with a "1620 Data Processing System" manufactured by International Business Machines Corporation. Since the construction and operation of this particular data processing system are shown and described in detail in a large number of publications, only a brief and simplified description of those portions of its operations which relate to the operation and control of the system 100 are described. As an example, the unit 102 obviously includes means, such as a printer or a punch assembly, by which a permanent record of the output data is provided. Further, the brief description of the illustrated computing means 102 utilizes the same nomenclature used in the available publications describing the specific "1620 Data Processing System" illustrated in the application.

In general, the computing means 102 includes a magnetic core storage unit or memory 114 providing twenty thousand individually addressed digit storage units, each providing the binary values or bits "1," "2," "4" and "8," a parity or check bit, and a flag bit. Access to the magnetic memory 114 is obtained by a pair of 10 x 10 selection or switching matrices 116 and 118 in combination with an odd and even control 120 which selectively enables and inhibits a pair of odd and even current sensing or readout amplifiers 122 and 124. In this manner, any one of the twenty thousand storage units in the memory 114 can be accessed by an address in the range between "00000" and "19999."

The outputs of the amplifiers 122 and 124 are supplied to a pair of memory buffer registers (MBR) 126 and 128 which store two digits read out of the memory to provide means for selectively returning two digits to the memory 114 and supplying a digit through a pair of logic gates 130 and 132 selectively enabled by the odd-even control 120 to a memory data register (MDR) 134. By selectively enabling the memory buffer registers 126 and 128, a digit read from the memory 114 can be cleared or restored to its prior storage location. In the illustrated system 100, the memory buffer register 126, 128 is not only supplied with input signals from the current sensing amplifiers 122 and 124 and a main data bus 136 connected to the output of the memory data register 134 but also from the line adapter 112 over a line 138.

The selection of a storage unit in the memory 114 to receive or to deliever a digit is controlled by a memory address register (MAR) 140 whose output is connected over a cable or bus 142 to the switching matrices 116 and 118 and also the input of the line adapter 112. The memory address register 140 also supplies an odd-even control signal which is forwarded over a conductor 144 to the odd-even control 120 and to an input of the line adapter 112. The input of the memory address register 140 is coupled by a plurality of output or current sensing amplifiers 146 to a memory address register storage unit 148 including a plurality of memory address registers for storing different instruction addresses. The input to the memory address register storage 148 is coupled to a group of input or current amplifiers 150, the inputs of which are coupled to the output of the memory address register 140 through an increment-decrement control 152 and to a digit register 154 which is supplied with information from the memory buffer registers 126, 128 and the memory data register 134. An operation register 156 is provided for storing an operation code which controls the nature of the function or data handling operation performed by the computer 102.

The computer 102 is designed for operation with a twelve digit instruction consisting of a two digit operation code, a five digit "P" address, and a five digit "Q" address. The two digit operation code determines the nature of the data handling operation performed by the computer 102, and, insofar as the present application is concerned, the "P" and "Q" addresses are used to specify locations from which and to which data is transmitted and received. When an instruction is transferred from the memory 114 to the address storing portion of the computer 102, the operation code is transferred to the operation register 156, and the "P" and "Q" addresses are stored in different ones of the registers in the memory addres register stsorage 148, the particular "P" and "Q" address to be used being transferred to the memory address register 140 through the amplifiers 146 at the time of use.

As indicated above, it is possible to access any given storage unit in the memory 114 with an address from "00000" to "19999," and the address for controlling access to the memory 114 is stored in the memory address register 140. Access to and the interchange of information between the computer 102 and the plurality of remote home units 104 and 106 is obtained by assigning to the line unit 110 an address in a range outside of the range used to address the memory 114. Similarly, the start control 105 and the timing circuit 107 are assigned addresses outside of the range assigned to the internal memory 114. In the illustrated system, the line unit 110 and the units 105 and 107 are assigned addresses greater than "30000." As an example, ten digits are required for communicating with the line unit 110, and the necessary addresses can be assumed to be "30010–30019." The start control 105 requires six digits for communication with the unit 102 and is assigned, for example, the addresses "30190," "30192," and "30196–30199." The timing unit 107 requires a four digit address and is assigned, for example, the addresses "30006–30009." By thus assigning these addresses to the units 105, 107, and 110, these units can be accessed by the address register 140 within the operating cycle of the computer 102 and without interference with the addressing of the memory 114.

The operation of the system 100 to select the home units 104, 106 and to receive information therefrom is performed in the manner described in detail in the above-identified copending Haselwood application, Ser. No. 496,361. In general, the stored program in the data handling unit 102 is such that the line unit 110 and other units similar thereto are sequentially selected through the line adapter 112 to cause the transmission of data stored therein to the unit 102 for storage in the memory 114. As the information is collected from the storage means in each of the line units, the address of the next one of the home units to be interrogated is placed in storage in the line units so that the line units then select the desired home units and control the transmission of data from the home units back to the line units for storage therein.

The data handling unit 102 can receive data from and supply home unit address information to the line units 110 at a much greater speed than this information can be used to select home units and cause the retransmission of reply data. It is possible to provide a storage program with a routine or subroutine which causes the unit 102 to repeatedly seek out line units having information available for transmission to the unit or to provide a software or hardware interrupt arrangement by which the presence of data in the line units 110 for transfer can cause an immediate transfer to a subroutine for transferring data from the line units to the memory 114. However, these procedures all have the disadvantage that it is necessary to maintain the data handling unit 102 in an operative condition during these waiting time periods or the utilization of the unit 102 is not as efficient as would be desirable. Certain of the waiting periods can be utilized for performing operations on previously accumulated data. However, not all such periods can be used, and the requirement that the unit 102 be maintained in an operative condition while awaiting the receipt of data unduly increases the computer rental charges.

In accordance with the present invention, the stored program for the data handling unit 102 includes as a part of certain of the routines or subroutines therein a series of instructions that are effective at the end of the period in which the unit 102 can be fruitfully occupied for transferring to and storing in the start control unit 105 a future time entry representing the time at which the computer 102 is to be placed in operation. This future time entry can be established by addressing the timing circuit 107 to supply a real time entry to a work area in the storage area 114, by adding a variable or constant to real time, and by then transferring the established future time from the work area in the memory 114 to the storage means in the start control 105. The stored program for the data handling unit 102 then includes an instruction placing this unit in an off or inoperative condition.

The future time entry stored in the start control 105 is continuously compared with real time or elapsed time derived from the timing circuit 107. When a predetermined relationship is established between the real time and the future time entry, commonly equality, the start control unit 105 is actuated to place the unit 102 in operation. The unit 102, upon being placed in operation, initiates its main line program which is carried out so long as the computer time can be fruitfully utilized.

Figure 5A:
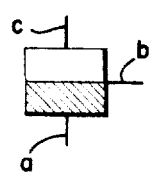
Figure 5B:
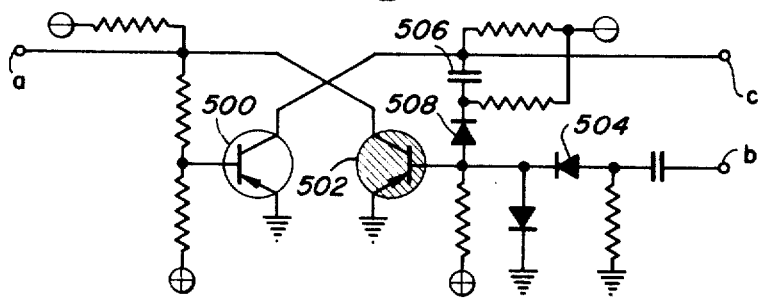
Figure 6:
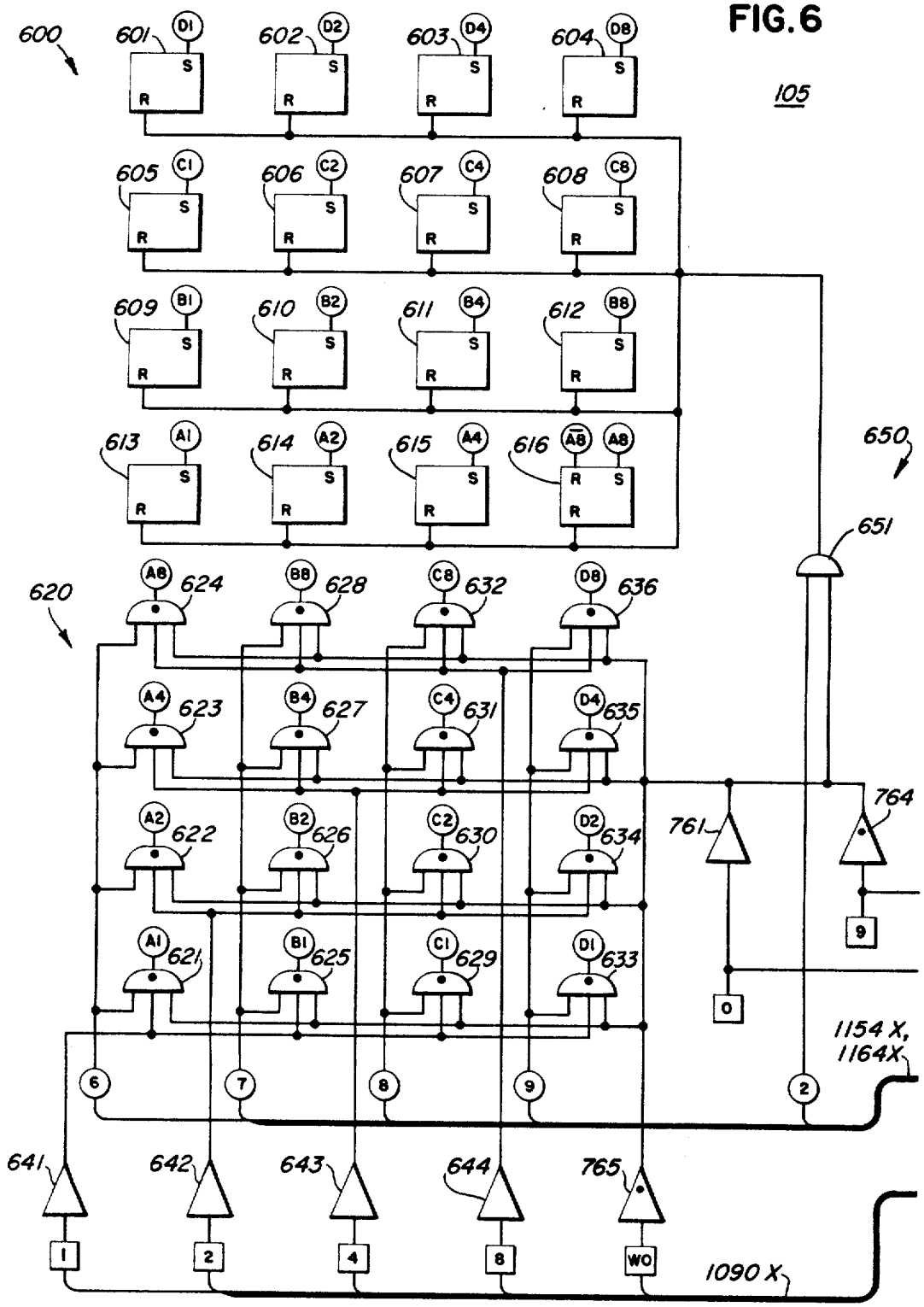
FIGS. 6 and 7, when placed side-by-side, form a schematic diagram of the data handling system.
Figure 7:
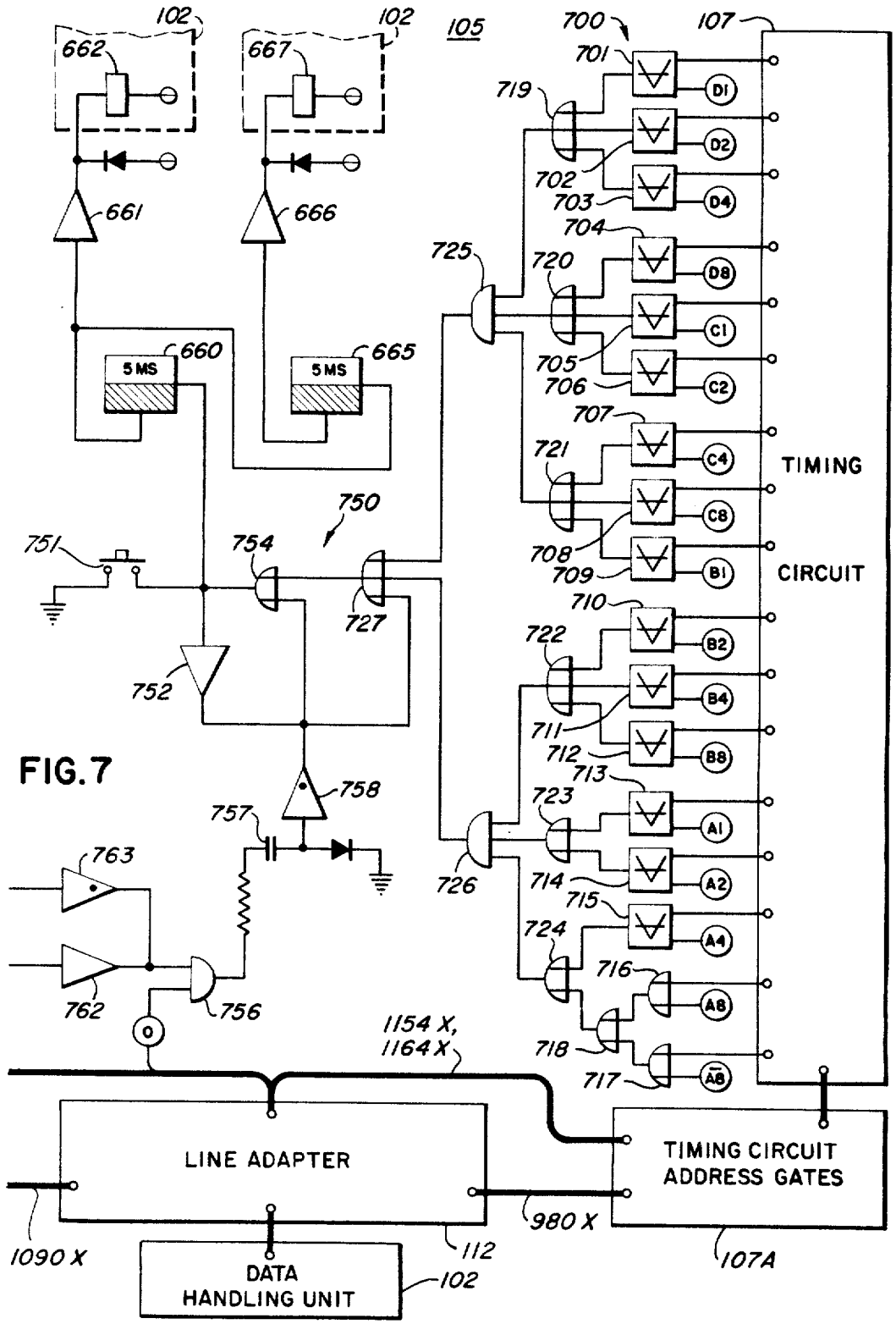

The details of the data handling system 100 embodying the present invention are illustrated in FIGS. 6 and 7 by the use of logic diagrams in which the various circuit components are shown in logic schematic form. In the logic diagrams, these circuit components, such as a flip-flop, are represented by a particular logic symbol. The logic symbols and typical circuit arrangements represented by the logic symbols for certain of the components shown in FIGS. 6 and 7 are illustrated in FIGS. 2–5 of the drawings. Each of these figures includes both an illustration of the logic symbol and a typical circuit represented by the symbol. Although the illustrated representative circuits are conventional in design and well known in the art, a brief description of certain of the circuits is set forth below.

Figure 2A:
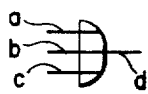
FIGS. 2–5 illustrate logic symbols and typical circuits for the different circuit components used in illustrating the data handling system.
Figure 2B:
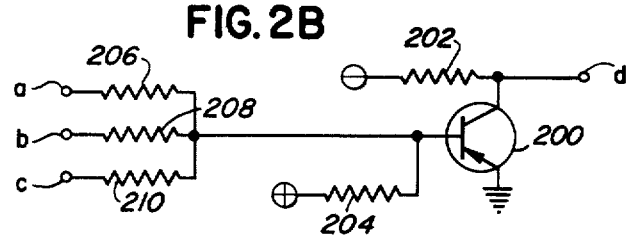

The logic symbol for a "NOR" gate is illustrated in FIG. 2A, and a typical circuit for this "NOR" gate is illustrated in FIG. 2B. Whenever a more negative potential is applied to any one of a plurality of input terminals $a$, $b$, or $c$, a more positive signal approaching ground is provided at an output terminal $d$. The "NOR" gate includes a transistor 200 whose collector is connected to a nominal negative potential of twelve volts through a resistor 202. The emitter of the transistor 200 is returned to ground potential, and the base is connected to a nominal twelve volt positive potential through a resistor 204. The base is also connected to the input terminals $a$, $b$, and $c$ through three series resistors 206, 208, and 210, respectively.

Whenever one of the terminals $a$, $b$, or $c$ is connected to a more negative potential, the base of the transistor 200 is biased negative with respect to its emitter, and this transistor is placed in a conductive condition so that a potential approaching ground is applied to the output terminal $d$. Alternatively, when all of the input terminals $a$, $b$, and $c$ are returned to a potential approaching ground, the base of the transistor 200 is biased positive with respect to its emitter, and this transistor remains in a nonconductive condition to apply a more negative potential to the output terminal $d$. In the circuit diagram shown in FIGS. 6 and 7, the "NOR" gate shown in FIG. 2 can be provided with any number of inputs. Further, in certain applications, the collector load 202 for the transistor 200 is not provided. In these instances, a dot is disposed within the generally semicircular outline of the logic symbol for the "NOR" gate shown in FIG. 2A.

Figure 3A:
Figure 3B:
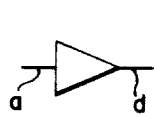
Figure 3C:
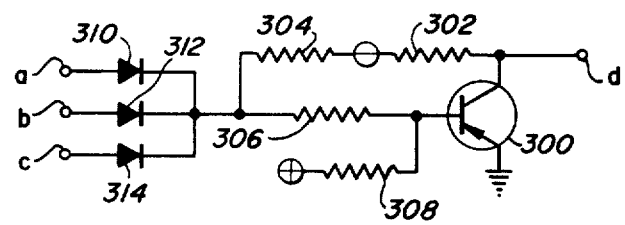

A logic symbol for a "NAND" gate is shown in FIG. 3A of the drawings, and a typical circuit for this "NAND" gate is illustrated in FIG. 3C. Whenever all of a plurality of inputs $a$, $b$, and $c$ to the "NAND" gate are returned to a more negative potential, a more positive potential approaching ground is applied to an output terminal $d$.

The "NAND" gate includes a transistor 300 whose collector is connected to a negative potential through a resistor 302. The emitter of the transistor 300 is returned to ground potential, and the base of the transistor is connected to a voltage dividing network including three resistance elements 304, 306, and 308 connected in series between positive and negative potentials. Whenever any one of the input terminals $a$, $b$, or $c$ is placed at ground potential, the point of common connection of the resistance elements 304 and 306 is returned to substantially ground potential, and the base of the transistor 300 is maintained at a positive potential relative to its emitter. This maintains the transistor 300 in a nonconductive condition so that a more negative potential is applied to the output terminal $d$.

However, when all of the input terminals $a$, $b$, and $c$ are returned to a negative potential, the three individually associated diodes 310, 312, and 314 are all biased in a reverse direction, and the voltage dividing network including the resistance elements 304, 306, and 308 maintains the base of the transistor 300 negative with respect to its emitter. This places the transistor 300 in a conductive condition so that the output terminal $d$ is placed substantially at ground potential. If the collector load resistance 302 is removed from the "NAND" gate, a dot is placed in the generally semicircular outline of the logic symbol shown in FIG. 3A. This gate is used with varying numbers of inputs in the circuit diagram shown in FIGS. 6 and 7.

A modified form of the "NAND" gate circuit illustrated in FIG. 3C is also used in the circuit diagram to provide an inverter which is represented by the logic symbol shown in FIG. 3B. More specifically, the "NAND" circuit is provided with only the single input $a$. Accordingly, whenever a negative-going signal is applied to the terminal $a$, a diode 310 is biased in a reverse direction, and the transistor 300 is placed in a conductive condition to deliver a positive-going signal at the output terminal $d$. As in the case of the "NAND" gate logic symbol shown in FIG. 3A, the absence of the collector load resistance 302 in the inverter is represented by the presence of a dot within the generally triangular outline of the symbol shown in FIG. 3B.

Figure 4A:
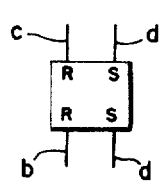
Figure 4B:
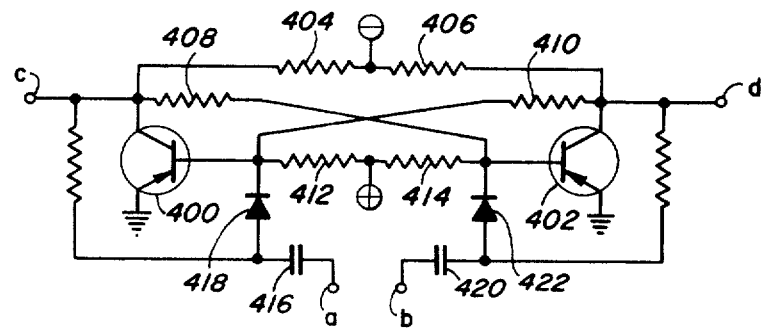

FIG. 4A illustrates a logic symbol for a control flip-flop, and FIG. 4B illustrates a typical circuit diagram for the flip-flop. The circuit shown in FIG. 4B includes a pair of transistors 400 and 402 whose collector electrodes are connected to a source of negative potential through a pair of resistance elements 404 and 406. The bases and collectors of the two transistors 400 and 402 are cross-coupled through a pair of resistance elements 408 and 410 which are returned to a positive potential through a pair of resistance elements 412 and 414.

When a positive-going signal is applied to a set input terminal $a$, this signal is coupled through a capacitor 416 and a diode 418 to be applied to the base of the transistor 400. This places the base of the transistor 400 at a positive potential with respect to its grounded emitter and places this transistor in a nonconductive condition so that a more negative potential is applied to a reset output terminal $c$. When the transistor 400 is placed in a nonconductive condition, a more negative potential is applied to the base of the transistor 402 so that this transistor is placed in a conductive condition to apply a more positive potential approaching ground to a set output terminal $d$. Conversely, when a positive-going pulse or signal is applied to a reset input terminal $b$, this signal is coupled through a capacitor 420 and a diode 422 to drive the base of the transistor 402 positive with respect to its grounded emitter. This places the transistor 402 in a nonconductive condition so that a more negative potential is applied to the set output terminal $b$. This more negative potential places the transistor 400 in a conductive condition so that a more positive potential approaching ground is applied to the reest output terminal $c$. Thus, the application of a more positive pulse to one of the set or reset inputs produces a corresponding more positive steady state output on the corresponding output terminal.

In the logic diagram shown in FIG. 4A, the inputs are represented by lead lines to which arrowheads are applied, and the outputs are represented by only lead lines. In the circuit diagram of FIGS. 6 and 7, the arrangement of the input and output lines relative to the square of the logic symbol is varied, and, in some instances, not all of these lines are used or shown. Further, the normal output lines $c$ and $d$ are sometimes used as inputs as well as outputs. When a ground or a negative input is applied to one of the terminals $c$ or $d$, the flip-flop is set to a condition in which this same polarity signal is provided as an output when the input to the terminal $c$ or $d$ is removed.

FIGS. 5A and 5B illustrate, respectively, a logic symbol for and a typical circuit of the monostable multivibrator. In the circuit shown in FIG. 5B, a transistor 500 is normally in a nonconductive condition, and a transistor 502 is normally in a conductive condition. Thus, ground potential is normally supplied to an output terminal $a$, as indicated by the shaded portion of the logic symbol in FIG. 5A, and a more negative potential is applied to an output terminal $c$, as indicated by the unshaded portion of the logic symbol in FIG. 5A. When the signal applied to an input terminal $b$ changes from a more negative value to a more positive value, a coupling capacitor forwards a positive-going pulse through a diode 504 to be applied to the base of the transistor 502. This drives the base of this transistor positive with respect to its emitter, and the transistor 502 is placed in a nonconductive condition. Thus, the potential at the output terminal $a$ drops to a more negative value. Further, when the transistor 502 is placed in a nonconductive condition, a more negative potential is applied to the base electrode of the transistor 500 from a voltage dividing network connected to its base. This places the transistor 500 in a conductive condition. Thus, the potential at the output terminal $c$ rises from a more negative potential toward ground potential.

In the normal condition of the monostable circuit shown in FIG. 5B, a capacitor 506 is charged substantially to the negative supply potential. When the transistor 500 is placed in a conductive condition, one terminal of the capacitor 506 is clamped at ground potential, and the potential to which this capacitor is charged biases a diode 508 in a reverse direction so that the base of the transistor 502 is maintained at a positive potential to hold this transistor in a nonconductive condition. The charge on the capacitor 506 discharges over an interval determined by the RC constants of the connected network. When the charge on the capacitor 506 is suitably dissipated, the diode 508 is no longer biased in a reverse direction and is placed in a conductive condition so that the base of the transistor 502 is again placed at a negative potential relative to its emitter. The transistor 502 now returns to a conductive condition and places the transistor 500 in a nonconductive condition so that the normal output potentials are applied to the terminals $a$ and $c$. In the schematic circuit diagrams in FIGS. 6 and 7, the delay time of each monostable circuit is indicated in the unshaded upper portion of the logic symbol.

The construction and operation of the system 100 insofar as it relates to the transmission of address information to and the reception of data items from the home units 104 and 106 is described in detail in the above-identified copending Haselwood application, Serial No. 496,361. This application also describes and discloses the construction and operation of the line adapter 112 which provides the interface between the central data handling unit 102 and both the start control 105 and the timing circuit 107. To facilitate an understanding of the interrelation of the components shown in the prior Haselwood application and the detailed circuit shown in FIGS. 6 and 7 of the drawings, a group of cables 980, 1090, 1154, and 1164 from the prior application, which cables interconnect the line adapter 112 and the units 105 and 107, are identified by corresponding reference numbers in FIGS. 6 and 7 followed by the suffix "X." Thus, the cable 1090 in the above-identified copending Haselwood application is identified as the cable 1090X in the present application. The signals on these cables designated by a circular rather than a square terminal are inverted in polarity from those in the prior application.

The timing circuit 107 is shown in FIG. 7 in block form. This timing circuit can comprise any suitable timing circuit of the many types well known in the art but preferably comprises a plurality of series connected counting circuits consisting of coupled flip-flop circuits. The lowest ordered counter is driven by constant frequency pulse source, such as a pulser driven by conventional 60 c.p.s. alternating current. In one desirable arrangement useful in the present invention, the numbers of stages in the different series coupled counters are so arranged that four successive counting circuits provide binary coded decimal digits representing tenths of second, units, tens and hundreds digits of time expressed in seconds. These values of tenths, units, tens and hundreds digits of time are expressed in a binary coded decimal form using the binary weights "1," "2," "4" and "8" so as to be compatible with the binary coding used in the data handling unit 102.

To provide means for transferring real or elapsed time data from the counter 107 to the data handling unit 102, a plurality of timing circuit address gates 107A are interposed between the timing circuit 107 and a read data line or cable 980X which supplies binary decimal coded data to the line adapter 112 for transfer to the data handling unit 102. The gate means 107A for the timing circuit 107 includes four groups of gates each representing the binary weights "1," "2," "4," and "8," and each one of the four groups is assigned to tenths, units, tens, and hundreds digits of time expressed in seconds. In accordance with the assumption set forth above, these gates are sequentially accessed by the addresses "30006–30009" representing the hundreds, tens, units, and tenths digits of time. Thus, when these four addresses are sequentially presented to the gate means 107A in either ascending or descending order, the corresponding digits of real time are transferred over the cable 980X to the data handling unit 102.

The settings of the timing counters in the timing circuit 107 are also supplied to a comparison gate network 700 (FIG. 7) in the start control 105. More specifically, the outputs representing the "1," "2," "4," and "8" bits of the decimal tenths of a second digit are supplied to one input of four exclusive "OR" gates 701–704, and the four corresponding bits of the units and tens seconds digits are supplied to one input of two groups of four exclusive "OR" gates 705–708 and 709–712. The signals representing the "1," "2," and "4" bits of the hundreds seconds digit are supplied to one input of three exclusive "OR" gates 713–715, and the signals representing an "8" bit and "8" bit are supplied to the inputs of two gates 716 and 717. In this manner, marking signals representing elapsed or real time are supplied from the timing circuit 107 to the start control circuit 105. The exclusive "OR" gates 701–715 are of any suitable well known construction.

The other input terminals to the gates 701–717 are connected to the designated terminals of sixteen storage flip-flops 601–616 (FIG. 6) forming a time entry storage means in the start control circuit 105. The flip-flops 601–604 store the "1," "2," "4," and "8" bits of the tenths seconds digit and include set terminals connected respectively to the designated terminals of the gates 701–704. Similarly, the flip-flops 605–608 store the "1," "2," "4," and "8" bits of units seconds digit, and the set terminals of these flip-flops are connected to the designated terminals of the gates 705–708. The flip-flops 609–612 store the "1," "2," "4," and "8" bits of tens seconds digit and are connected to the designated terminals of the gates 709–712. The flip-flops 613–616 store the "1," "2," "4," and "8" bits of the hundreds seconds digit, and the set terminals of these flip-flops are connected to the designated terminals of the gates 713–715. The set and reset terminals of the "8" flip-flop 616 are connected to the designated terminals of the gates 716 and 717.

The flip-flops 601–616 forming the time entry storage means 600 are selectively supplied with a time entry under the control of an address gate assembly 620 including sixteen gates 621–636. The gates 621–624 are connected to the designated set terminals of the flip-flops 613–616 for storing the hundreds seconds digit, these set terminals providing both input and output terminals. Similarly, the outputs of the gates 625–628 are connected to the designated terminals of the tens seconds flip-flops 609–612, and the gates 629–632 are connected to the designated set terminals of the units seconds flip-flops 605–608. The output terminals of the gates 633–636 are connected to the designated terminals of the tenths second flip-flop 601–604. The gate means 620 is selectively addressed by the central data processing unit 102 to provide addressable means for storing the future time entry in the storage means 600.

To illustrate a typical operation of the start control 105, it is assumed that the system 100 is in operation and that the data handling unit 102 is carrying out a program of receiving data items from the plurality of homes 104, 106 and transferring addresses to the line units 110 for controlling the subsequent transfer of data items from the home units 104, 106 to the line units 110. When the end of these routines or subroutines in the program has been reached or at the time at which the data handling unit 102 finds that time can no longer be fruitfully occupied in performing the necessary data handling operations, this unit can branch to an operation terminating routine or subroutine by the use, for instance, of a conditional transfer operation. In this subroutine the time entry storage means 600 is reset, a coincident latch for indicating identity between the entry in the register 600 and the current setting of the timing circuit 107 is reset, and a future time entry is transferred into the reset register 600 through the address gate means 620. The operation of the data handling unit 102 is then terminated. The data handling unit 102 remains in this off condition until placed in operation by the start control 105.

When the data handling unit 102 enters the operation terminating routine or subroutine, the time entry storage means 600 is first reset to a normal condition by addressing a reset means 650 in the start control 105. Assuming that the reset means for the time entry storage means 600 is addressed as "30192," this address is derived from the unit 140 (FIG. 1) and forwarded through the line adapter 112 to supply positive-going signals to the input of a pair of inverters 761 and 764 representing the hundreds digit "1" and the tens digit "9." As set forth in detail in the above-identified copending Haselwood application, Serial No. 496,361, the line adapter 112 includes means by which a positive-going signal is supplied to the inverters 761 and 764 over the cable 1154X, 1164X only when the address falls outside the range used to address the internal core storage 114 in the data handling unit 102. The data handling unit 102 also supplies a write pulse through the adapter 112 and over a conductor in the cable 1090X which is applied to the input of an inverter 765. This positive-going pulse places the inverter 765 in a non-conductive condition so that all three of the inverters 761, 764, and 765 are placed in a nonconductive condition in accordance with the portion "3019" of the reset address "30192."

The negative-going pulse provided at the output of the inverters 761, 764, and 765 is applied to one input of a register reset gate 651 in the reset assembly 650. The other input to the gate 651 is connected to a conductor in the cable 1154X, 1164X which receives a negative-going pulse representing the units digit "2" in the address of the resetting means 650. Accordingly, the "NAND" gate 651 is fully enabled and applies a positive-going pulse to the reset inputs of all of the storage flip-flops 601–616 in the time entry storage means 600. Thus, the receipt of the address "30192" resets the time entry means by placing all of the flip-flops 601–616 in a reset position in which a negative potential is applied to the set output terminals.

The program, routine, or subroutine in the data handling unit 102 then proceeds, as by a branch-on digit instruction, to initiate the storage of a future time entry in the reset time entry storage means 600. The nature of the time entry to be stored can be determined at this time or can be taken from storage in the core storage unit 114. As an example, the data handling unit 102 can now begin a sequence of instructions by which a real time entry is transferred from the timing circuit 107 to a work area in the memory 114 by a transfer field instruction in which the timing circuit address gates 107A are addressed, i.e., "3009–3006" and the corresponding storage locations in the work area in the memory 114 are concurrently addressed to receive the transferred time entries. A factor, either fixed or determined by arithmetic operations, can be added to the real time stored in the work area, and the resultant time entry can then be transferred, as by a transfer field operaiton, from the work area in the memory 114 through the address gate means 620 to the time entry storage means 600 in the start control 105.

Assuming that the future time entry has been established in the work area in or is available from storage in the memory 114, the addresses in the work or storage area of the tenths, units, tens, and hundreds seconds digits are sequentially set up in combination with a transfer field operation code and the addresses "30199–30196" individual to the tenths, units, tens, and hundreds seconds digit gates. More specifically, when the address for the tenths second digit "30019" is set up and a write signal received, the three inverters 761, 764, and 765 are again placed in a nonconductive condition to apply a negative enabling signal to one input of all of the gates 621–636. The "9" units address digit conductor in the cable 1154X, 1164X also receives a negative-going pulse to enable a second input to the gates 633–636. The remaining inputs of the four gates 633–636, which have two enabled inputs, are connected to the outputs of four inverters 641–644 which are connected to the write data bus or cable 1090X on which binary coded decimal signals representing the value of the tenths of seconds digit are supplied from the addressed storage location in the memory 114. These signals from the write data bus selectively complete the enabling of the gates 633–636 so that selected ones of the flip-flops 601–604 are set to supply a pattern of ground and negative potentials to their set output terminals in accordance with the value of the tenths of a second digit. During succeeding cycles, the "8," "7," and "6" units address digit conductors are enabled in sequence along with signals supplied to the inputs of the inverters 761, 764, and 765 to sequentially enable the three remaining groups of input gates 629–632, 625–628, and 621–624 to selectively set the flip-flops 605–608, 609–612, and 613–616 under the control of the binary coded decimal signals supplied over the write data bus 1090X from the concurrently addressed storage locations in the memory 114.

The setting of the time entry storage means 600 to a setting representing the future time entry supplies a pattern of ground potentials and negative potentials to the indicated terminals of the gates 701–717. The gates 701–715 provide an output potential approaching ground if their two inputs are at the same potential and provide a more negative potential if their two inputs are at different potentials. Thus, the exclusive "OR" gates 701–715 together with the gates 716, 717, and 718 provide a means for making a first level determination of the equivalence of the elapsed or real time provided by the circuit 107 and the future time entry stored in the storage means 600. Since, in the assumed example, the time stored in the storage means 600 is not equivalent to the time entry provided by the timing circuit 107, at least one of the gates 701–715 and 718 supplies a negative potential to one of six second level gates 719–724. Thus, the output of at least one of these gates supplies a more positive potential to one input of a pair of third level "NAND" gates 725 and 726. Accordingly, at least one of these two gates supplies a more negative potential to the one of the lower two inputs of a final level gate 727. The third or lower input to the gate 727 is connected to the output of an inverter 752 in a coincidence latch circuit 750 and is supplied with ground potential by the inverter 752 when the latch is reset. Since one of the third level gates 725 or 726 supplies a negaitve potential to one of the inputs of the final level gate 727, the output of this gate rises to approximately ground potential to apply a more positive signal to one input to a gate 754 in the coincidence latch circuit 750.

The coincidence latch 750 includes the inverter 752 and the gate 754, the output of which should normally be at a more negative potential except when coincidence is detected between the current setting of the real time or elapsed time circuit 107 and the time entry stored in the storage means 600. The output of the gate 754 is also connected to the input of the inverter 752, and the output of the inverter 752 is connected to one input to the gate 754 so that the components 752 and 754 provide a circuit having two states of stability.

To provide means for resetting the coincidence latch circuit 750, the operation terminating subroutine or routine includes an address individual to a resetting circuit in the start control 105. Assuming that the address individual to the resetting circuit is "30190," this address is now set up in the unit 140 (FIG. 1) in the data handling unit 102 and transferred through the line adapter 112 (FIGS. 1 and 6) and supplied over the cable 1154X, 1164X to the start control 105. One conductor in this cable supplies a positive-going pulse to the input of an inverter 763 representing the tens address digit "9," and a positive-going pulse is supplied to the input of an inverter 762 representing the hundreds address digit "1." As set forth in detail in the above-identified copending Haselwood application, Serial No. 496,361, the line adapter 112 includes means for preventing the generation of these pulses unless the address has a value in excess of the range used to address the core storage 114. When positive-going pulses are applied to the inputs of both of the inverters 762 and 763, the commonly connected outputs thereof drop to a negative potential which is applied to one input of a gate 756 in the resetting circuit for the coincidence latch 750. The other input to this gate is connected to a conductor in the cable 1154X, 1164X and receives a negative-going pulse representing the value of the units address digit "0." These two pulses enable the gate 756.

When the gate 756 is fully enabled, a positive-going pulse is coupled through a capacitor 757 to the input of a normally nonconductive inverter 758. The inverter 758 is not of the type shown in FIG. 3C but rather is a single input "NOR" gate of the type shown in FIG. 2B. The leading edge of the positive-going pulse provided by the gate 756 and the capacitor 757 does not change the nonconductive state of the inverter 758. However, the trailing edge of the pulse provided by the gate 756 drives the inverter 758 into conduction for a period of time determined by the RC time constant of the input circuit. When the inverter 758 is placed in a conductive condition, the lower input to the gate 754 in the latch is held at approximately ground potential. Since the upper input to the gate 754 is at ground potential because of the lack of equivalence between the setting of the timing circuit 107 and the time entry storage means 600, the output from the gate 754 drops to a negative potential which is applied to the input of the inverter 752 to place this inverter in a conductive condition. The more positive or ground output of the inverter 752 is returned to the lower input of the gate 754 to hold the latch 750 in its reset condition when the momentary pulse provided at the output of the inverter 758 disappears.

The operation terminating routine or subroutine of the data handling unit 102 now places the unit 102 in an inoperative or off condition. The unit 102 remains in this inoperative state until it is started, either manually or under the control of the start control 105.

Assuming that the unit 102 is to be returned to operation under the control of the start control 105, a predetermined relation, such as equivalence of equality, is established between the settings of the time entry storage means 600 and the timing circuit 107. At this time, the inputs to all of the exclusive "OR" gates 701–715 are the same, and all of these gates supply more positive outputs. These outputs are combined with the outputs of the gate 718 in the second level gates 719–724 so that the outputs of all of these gates drop to a more negative potential. This inhibits all of the inputs to the third level gates 725 and 726 so that these outputs rise toward ground potential. Thus, all of the inputs to the final level gate 727 are now at a more positive potential. The output of this gate now drops to a negative potential to apply a more negative signal to the upper input of the gate 754 in the latch, and the output of the gate 754 rises toward ground potential and places the inverter 752 in a nonconductive condition. The negative output of this inverter is connected to the lower input of the gate 754 and holds the coincidence latch 750 in a condition in which the output of the gate 754 approaches ground potential. The negative output from the inverter 752 is also applied to the lower input to the gate 727 to hold the input of this gate at its more positive level. This prevents changes in the timing circuit 107 from changing the output of the gate 727.

The more positive output from the coincidence latch 750 is used to automatically reset and start the data handling unit 102. More specifically, the positive-going output from the gate 754 is applied to one input of a monostable circuit 660, the normal positive or ground output of which is connected to the input of an inverter 661. When the monostable circuit 660 is set by the output from the coincidence latch 750, a negative signal is applied to the input of the inverter 661 to place this inverter in conduction. The establishment of a conductive condition through the inverter 661 energizes the operating winding of a relay 662 disposed in and forming a part of the data handling unit 102. The operation of the relay 662 causes the resetting of the data handling unit 102 in the normal fashion.

The output of the monostable circuit 660 is also connected to the input of a second monostable circuit 665, but the negative potential provided at the output of the circuit 660 does not affect the conductive state of the circuit 665. At the end of a given interval, such as five milliseconds, the monostable circuit 660 is reset to terminate conduction through the inverter 661 and to release the rset relay 662 in the data handling unit 102. The positive-going potential provided at the output of the monostable circuit 660 sets the monostable circuit 665 so that its output potential drops to a more negative value and places an inverter 666 in conduction. The output of the inverter 666 is connected to a control relay 667 in the data handling unit 102. When the relay 667 is operated, the data handling unit 102 is placed in operation. After the circuit 665 times out, the inverter 666 is returned to a nonconductive condition and the relay 667 is released.

Thus, in response to automatically storing a future time entry in the time entry storage means 600 incident to the performance of a routine in which the data handling unit 102 is placed in an inoperative state, the control circuit 105 is conditioned to automatically return this data handling unit to an operative state at a future time which is either fixed with respect to real time or variable in dependence on the time of completing the prior operation. A manual switch 751 provides means for manually starting the data handling unit 102.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A system for automatically controlling the times at which operation of a data handling means is initiated, comprising
    timing means operable to different settings representing elapsed time,
    time entry storage means operable to a setting representing a time entry,
    means controlled by the data handling means during the carrying out of the program for controlling the time entry means to store a time entry representing the time at which the next program is to be initiated,
    start means in the data handling means for placing the data handling means in operation to carry out a program, and
    control means controlled by the timing means and the time entry storage means and connected to the start means for operating the start means when a predetermined relation exists between the settings of the timing means and the time entry means.

2. The system set forth in claim 1 in which the control means includes a plurality of data comparing gate means for comparing the settings of the timing means and the time entry storage means.

3. The system set forth in claim 1 in which the data handling means includes address means for supplying address signals and which includes,
    addressable means connected to the time entry storage means and the address means and controlled by the address signals for controlling the transfer of a time entry into the time entry storage means.

4. The system set forth in claim 3 including addressable reset means supplied with address signals from the data handling means and controlled by the receipt of a particular address to reset the time entry storage means.

5. The system set forth in claim 3 in which addressable gate means are connected between the data handling unit and the timing means and are controlled by the address signals to control the transfer of time data from the timing means to the data handling unit.

6. A system for controlling the periods of operation of a data handling unit of the type capable of carrying out a sequence of programmed operations in response to actuation of a start means and capable of terminating its operation at the conclusion of the program, comprising
    a timing circuit operable to successive settings representing elapsed time,
    a time entry storing circuit adjustable to different settings under the control of the data handling unit representing future times,
    comparing means coupled to the timing circuit and the time entry storing circuit for comparing the settings thereof,
    means coupled to the start means and controlled by the comparing means for operating the start means to place the data handling unit in operation to carry out its program,
    means for clearing the time entry storing means, and
    means controlled by the data handling unit for adjusting the setting of the cleared time entry storing means to a new setting in dependence on the next time at which the data handling unit is to be started.

7. A system for controlling the periods of operation of a data handling means to carry out data handling programs, which system comprises
    a time signal source providing time signals representing present time,
    control means altering the time signals representing present time incident to carrying out one program to a representation of a future time at which another program is to be carried out, storage means controlled by the control means for storing the altered time signals, comparing means supplied with the time signals and coupled to the storage means for comparing the time signals with the altered signals that have been stored, and means controlled by the comparing means for initiating a period of operation of the data handling means when a predetermined relation between the present and altered time signals is established.

8. The system set forth in claim 7 in which
the control means includes means for adding a fixed value to the time signals representing present time to obtain the altered time signals.

9. A system for controlling the periods of operation of a data handling means to carry out data handling programs, which comprises control means effecting externally of the data handling means and incident to the carrying out of one program the storage of a future time at which another program is to be carried out, a time signal source generating time indications externally of the data handling unit, comparing means supplied with the time signals and the stored future time for comparing the generated time indications with the future time that has been stored, and start means controlled by the comparing means for initiating operation of the data handling means when a predetermined relation between the generated time indications and the stored future time is established.

References Cited

UNITED STATES PATENTS

| | | | |
|---|---|---|---|
| 3,323,119 | 5/1967 | Barcomb et al. | 340—324 |
| 3,308,439 | 3/1967 | Tink et al. | 340—172.5 |
| 3,305,839 | 2/1967 | Looschen et al. | 340—172.5 |
| 3,297,996 | 1/1967 | Grady | 340—172.5 |
| 3,181,124 | 4/1965 | Hammel | 340—172.5 |
| 3,181,121 | 4/1965 | Lösch et al. | 340—147 |
| 3,134,016 | 5/1964 | Connolly et al. | 235—152 |
| 3,082,402 | 3/1963 | Scantlin | 340—152 |
| 3,063,036 | 11/1962 | Reach et al. | 340—172.5 |
| 2,910,238 | 10/1959 | Miles et al. | 235—167 |

PAUL J. HENON, *Primary Examiner.*

G. D. SHAW, *Assistant Examiner.*